United States Patent
Mun et al.

(10) Patent No.: US 9,513,537 B2
(45) Date of Patent: Dec. 6, 2016

(54) PORTABLE STUDIO UNIT

(71) Applicant: ORANGEMONKIE KOREA, INC., Seoul (KR)

(72) Inventors: Sang Kon Mun, Seoul (KR); Jun Myeong Park, Seoul (KR); Yong Su Cho, Seoul (KR); Seong Soo Park, Seoul (KR); Ji Young An, Busan (KR)

(73) Assignee: ORANGEMONKIE KOREA, INC., Seoul (KR)

( * ) Notice: Subject to any disclaimer, the term of this patent is extended or adjusted under 35 U.S.C. 154(b) by 0 days.

(21) Appl. No.: 14/764,982

(22) PCT Filed: Nov. 19, 2014

(86) PCT No.: PCT/KR2014/011098
§ 371 (c)(1),
(2) Date: Jul. 30, 2015

(87) PCT Pub. No.: WO2015/137597
PCT Pub. Date: Sep. 17, 2015

(65) Prior Publication Data
US 2016/0266476 A1    Sep. 15, 2016

(30) Foreign Application Priority Data

Mar. 13, 2014 (KR) .................. 10-2014-0029636

(51) Int. Cl.
| | | |
|---|---|---|
| G03B 17/56 | (2006.01) | |
| G03B 15/00 | (2006.01) | |
| G03B 15/07 | (2006.01) | |

(52) U.S. Cl.
CPC ............. *G03B 17/568* (2013.01); *G03B 15/00* (2013.01); *G03B 15/07* (2013.01)

(58) Field of Classification Search
CPC ......... G03B 15/00; G03B 15/02; G03B 15/06; G03B 15/07; G03B 17/568; G03B 17/48
See application file for complete search history.

(56) References Cited

U.S. PATENT DOCUMENTS 3,531,170 A * 9/1970 Boyer .................... A47B 19/08
229/145
4,487,787 A * 12/1984 Shioya .................. C23C 16/401
257/E21.149

(Continued)

FOREIGN PATENT DOCUMENTS

| JP | H10-260461 | 9/1998 |
|---|---|---|
| JP | 2001-027776 | 1/2001 |

(Continued)

OTHER PUBLICATIONS

"International Search Report (Form PCT/ISA/210)", mailed on Mar. 23, 2015, pp. 1-3.

*Primary Examiner* — W B Perkey
(74) *Attorney, Agent, or Firm* — Jianq Chyun IP Office (57) ABSTRACT

A portable studio unit includes a first main body portion configured to define any one plane among three axes planes constructing a three dimensional figure, a second main body portion connected to the first main body portion, a third main body portion located at an opposite side of the second main body portion with the first main body portion interposed therebetween, and pairs of side surface finishing portions arranged at side surfaces of the three dimensional figure corresponding to open regions defined by the first main body portion, the second main body portion and the third main body portion except for a front surface.

5 Claims, 11 Drawing Sheets

(56) References Cited

U.S. PATENT DOCUMENTS

| | | | | |
|---|---|---|---|---|
| 4,569,564 | A | * | 2/1986 | Ahmann .............. A47B 23/044 108/34 |
| 5,828,908 | A | * | 10/1998 | Mauchan ............. G03B 27/323 396/2 |
| 7,680,401 | B1 | * | 3/2010 | Adelstein ................ A45C 9/00 396/1 |
| 2005/0243538 | A1 | * | 11/2005 | Blanford ............... G03B 15/06 362/16 |
| 2006/0245745 | A1 | * | 11/2006 | Mazon .................. G03B 15/06 396/5 |
| 2015/0370146 | A1 | * | 12/2015 | Johnson ................ G03B 15/07 396/4 |

FOREIGN PATENT DOCUMENTS

| | | |
|---|---|---|
| JP | 2002-258365 | 9/2002 |
| JP | 2004-145023 | 5/2004 |

* cited by examiner

PORTABLE STUDIO UNIT

CROSS-REFERENCE TO RELATED APPLICATION

This application is a 371 application of an international PCT application ser. no. PCT/KR2014/011098, filed on Nov. 19, 2014, which claims the priority benefit of Republic of Korea application No. 10-2014-0029636, filed on Mar. 13, 2014. The entirety of each of the above-mentioned patent applications is hereby incorporated by reference herein and made a part of this specification.

TECHNICAL FIELD

The present invention relates to a studio unit and, more particularly, to a portable studio unit which allows a user to conveniently assemble the studio unit to photograph an object without visiting a studio and to simply collapse and carry the studio unit after photographing.

BACKGROUND ART

Owing to invigoration of blogs, Internet shopping malls, home pages and the like, there is a need to photograph an article and to post up the article photograph on the blogs, Internet shopping malls, and home pages.

However, in the case where an ordinary person directly takes a photograph using a camera, the person tends to photograph an article in a state in which background and light control with respect to the corresponding article are not realized.

In this case, for example, a shadow is generated in the background of the article, which problematically deteriorates the quality of the article photograph.

Due to this problem, most ordinary persons entrust a studio equipped with a photographing system, rather than trying to directly photograph an article.

Thus, photographing of an article requires a great time because the person has to visit the studio as an existing photographing platform and, moreover, the person cannot directly take a photograph.

DISCLOSURE

Technical Problem

Therefore, the present invention has been made in view of the above problems, and the present invention provides a portable studio unit which allows a user to conveniently photograph an article without visiting a studio equipped with an existing photographing platform.

Technical Solution

In accordance with an aspect of the present invention, the above and other objects can be accomplished by the provision of a portable studio unit including a first main body portion configured to define any one plane among three axes planes constructing a three dimensional figure, a second main body portion connected to the first main body portion so as to be folded to or unfolded from the first main body portion, a third main body portion located at an opposite side of the second main body portion with the first main body portion interposed therebetween, the third main body portion being connected to the first main body portion so as to be folded to or unfolded from the first main body portion, and pairs of side surface finishing portions arranged at side surfaces of the three dimensional figure corresponding to open regions defined by the first main body portion, the second main body portion and the third main body portion except for a front surface so as to delimit a receiving space when the second main body portion and the third main body portion are folded to the first main body portion such that the first main body portion defines a rear surface of the three dimensional figure facing the front surface and the second main body portion and the third main body portion are located opposite each other to define an upper surface and a lower surface of the three dimensional figure respectively, wherein, when the first main body portion, the second main body portion, the third main body portion and the side surface finishing portions construct the three dimensional figure, an article is introduced into and placed in the receiving space through the open front surface for photographing and, after photographing of the article ends, the second main body portion and the third main body portion are folded to overlap the first main body portion so as to allow the portable studio unit to be carried and stored in a thin plate form.

The side surface finishing portions may include a pair of second main body finishing portions connected to the second main body portion so as to be folded to or unfolded from the second main body portion, and a pair of third main body finishing portions connected to the third main body portion so as to be folded to or unfolded from the third main body portion, wherein, when the first main body portion, the second main body portion and the third main body portion are folded to construct the three dimensional figure in a photographing mode to enable photographing of the article, the third main body finishing portions are connected respectively to the second main body finishing portions to close some regions of the open side surfaces along with the second main body finishing portions.

In addition, the side surface finishing portions may further include a pair of first main body finishing portions connected to the first main body portion so as to be folded to or unfolded from the first main body portion, the first main body finishing portions being connected to the second main body finishing portions or the third main body finishing portions so as to close the open side surfaces in a state in which the second main body finishing portions and the third main body finishing portions are connected to each other.

In addition, in accordance with one embodiment of the present invention, the portable studio unit may further include a magnetic coupling means configured to enable magnetic coupling between at least one of the second main body finishing portions and the third main body finishing portions and the first main body finishing portions in a state in which the second main body finishing portions and the third main body finishing portions are connected to each other, in order to allows positions of the first main body finishing portions to be fixed relative to the second main body finishing portions and the third main body finishing portions.

In addition, in accordance with one embodiment of the present invention, the portable studio unit may further include a position fixing means configured to fix relative positions between the second main body portions and the third main body portions when the first main body portion, the second main body portion and the third main body portion are folded to construct the three dimensional figure in the photographing mode, and the position fixing means may include magnetically attracting pieces coupled to at least one of the second main body finishing portions and the third main body finishing portions and magnetically attracted pieces coupled to the third main body finishing portions, the magnetically attracted pieces being attracted by the magnetically attracting piece.

In addition, in accordance with one embodiment of the present invention, the portable studio unit may further include a photographing pad detachably attached to the receiving space, the article being placed on the photographing pad.

Advantageous Effects

The present invention assists everyone in easily photographing an article. As a result, by allowing a user to assemble a portable studio unit anywhere to easily photograph an article without visiting a studio as an existing photographing platform, the present invention has an effect of overcoming time and spatial limitations.

In addition, the present invention has an effect of allowing the portable studio unit to be collapsed for storage or carrying.

DETAILED DESCRIPTION OF DISCLOSED EMBODIMENTS

A portable studio unit according to one embodiment of the present invention will be described below with reference to the accompanying drawings.

Figure 1:
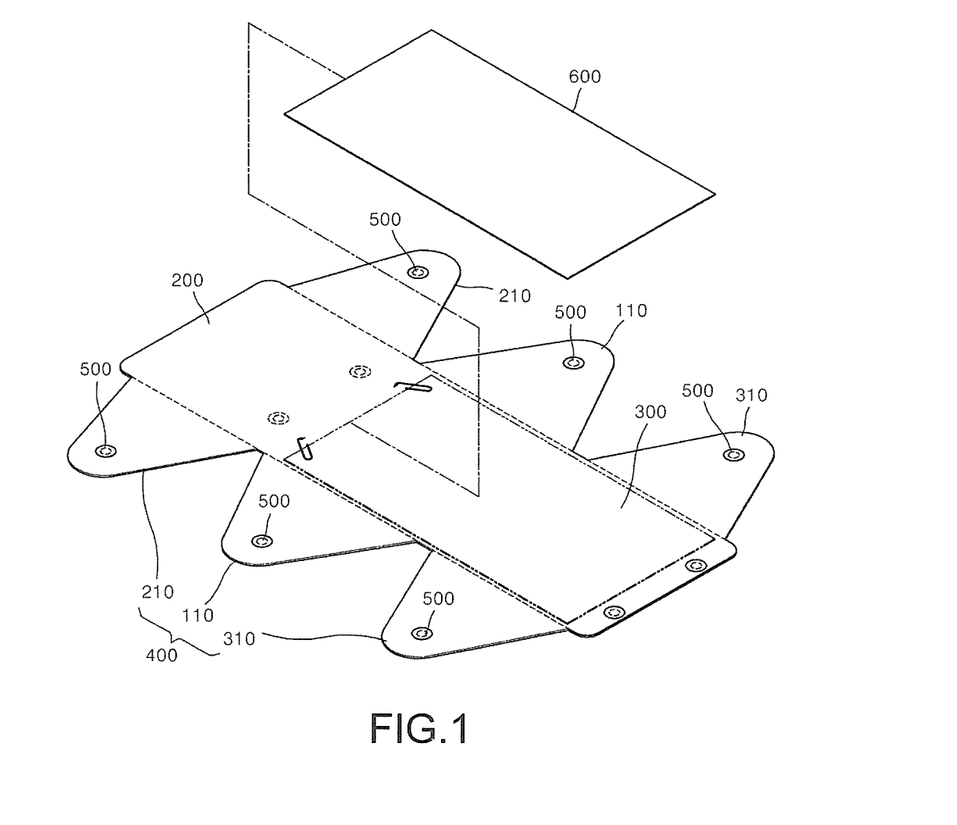
FIGS. 1 and 2 are development views illustrating a portable studio unit according to one embodiment of the present invention.
Figure 2:
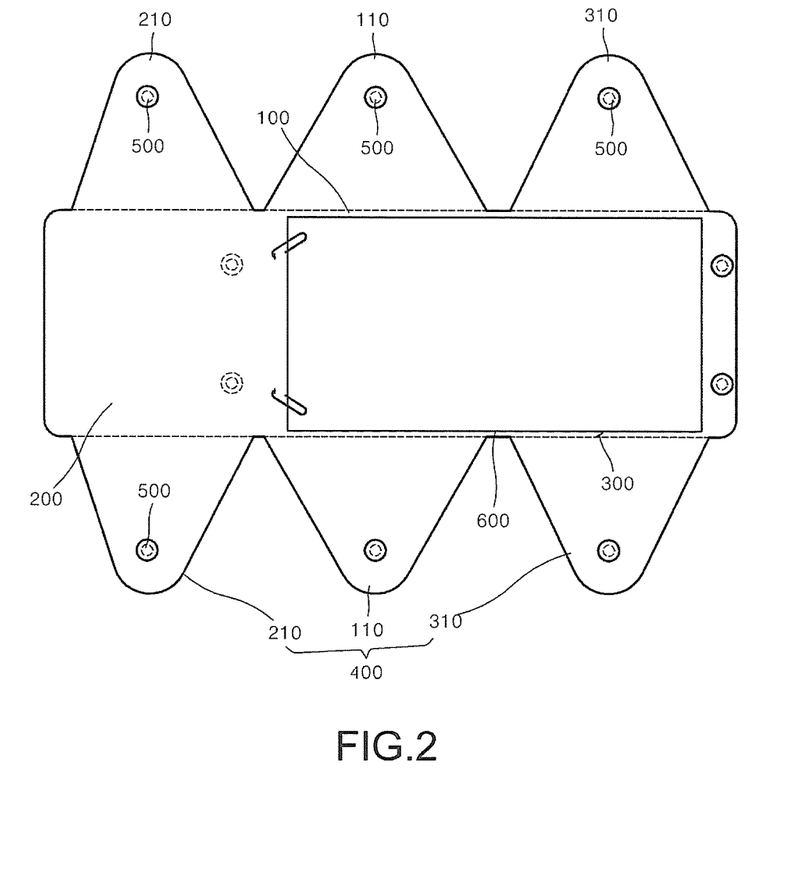
Figure 3:
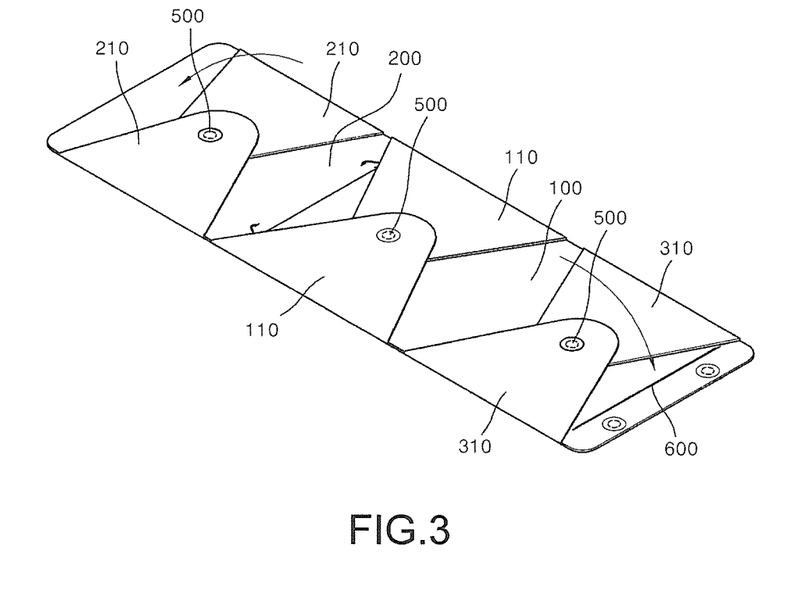
FIG. 3 is a perspective view illustrating a carrying mode according to one embodiment of the present invention.
Figure 4:
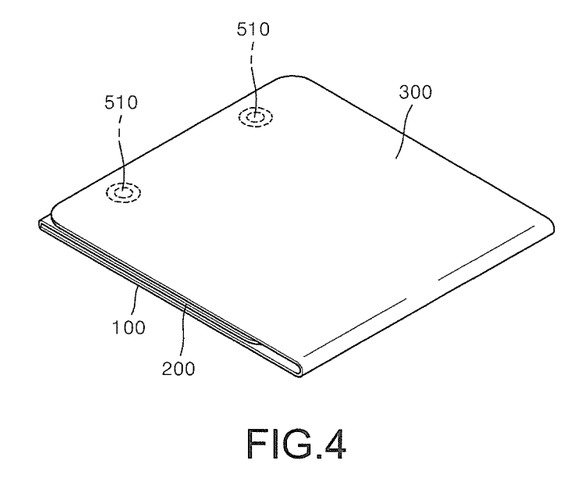
FIGS. 4 to 6 are operational state views illustrating a switching sequence from the carrying mode of FIG. 3 to a photographing mode.
Figure 5:
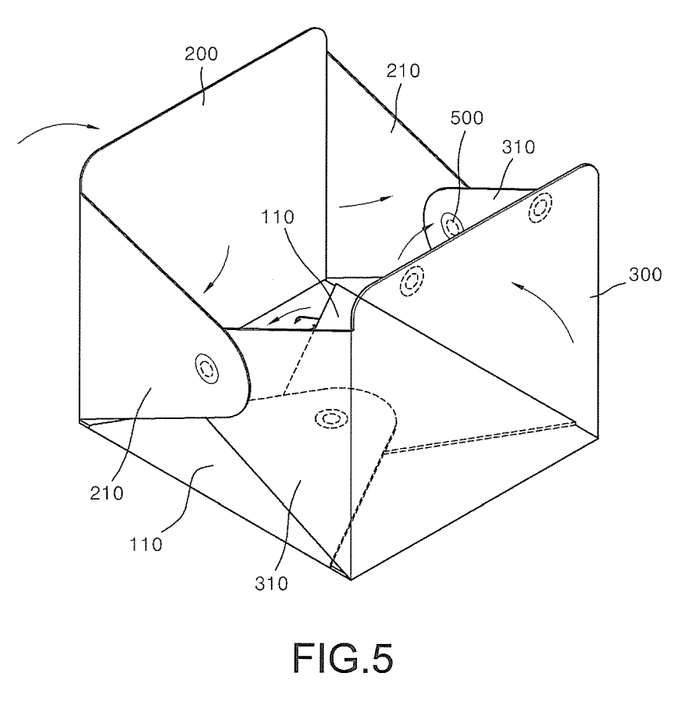
Figure 6:
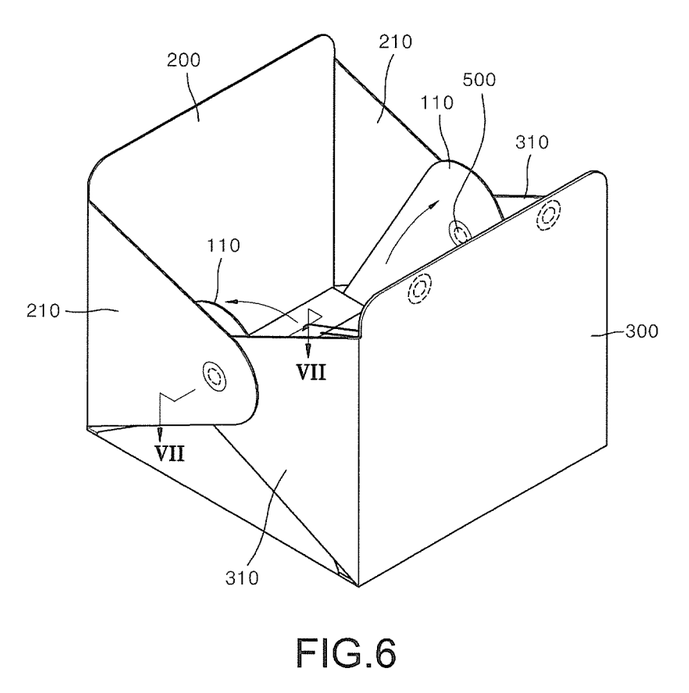
Figure 7:
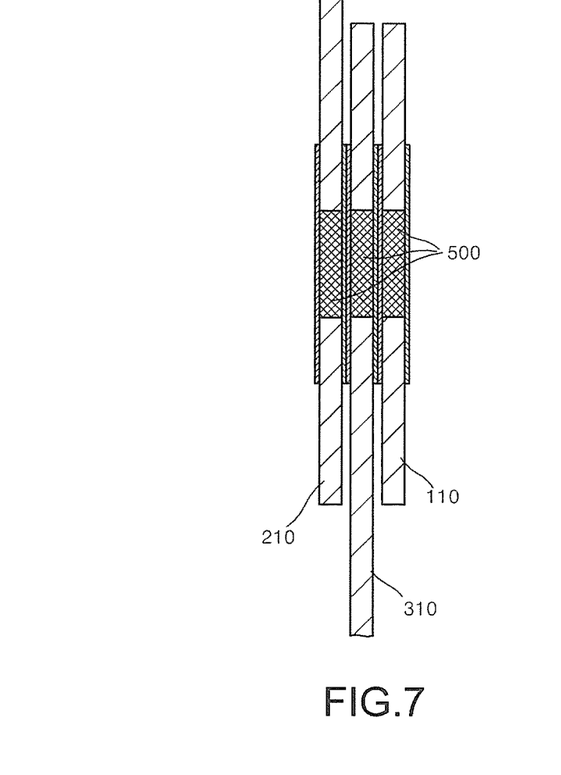
FIG. 7 is a sectional view taken along line VII-VII of FIG. 6.
Figure 8:
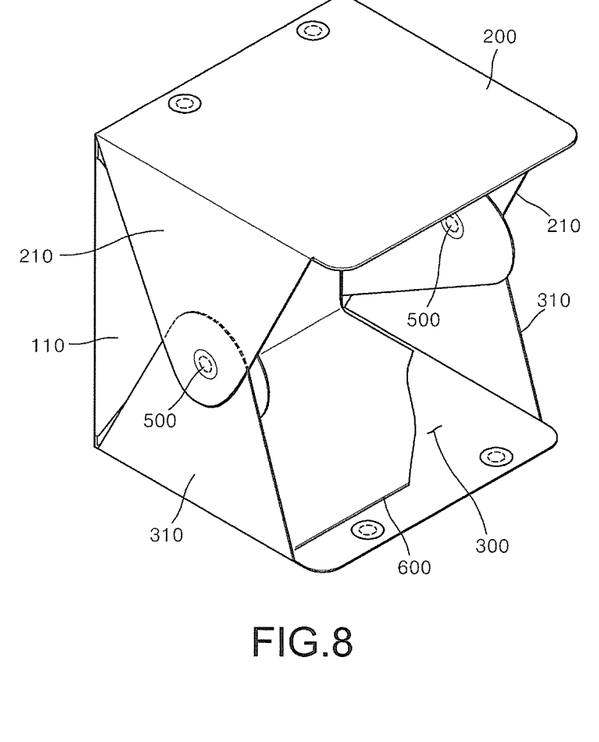
FIG. 8 is a perspective view illustrating a photographing mode according to one embodiment of the present invention.
Figure 9:
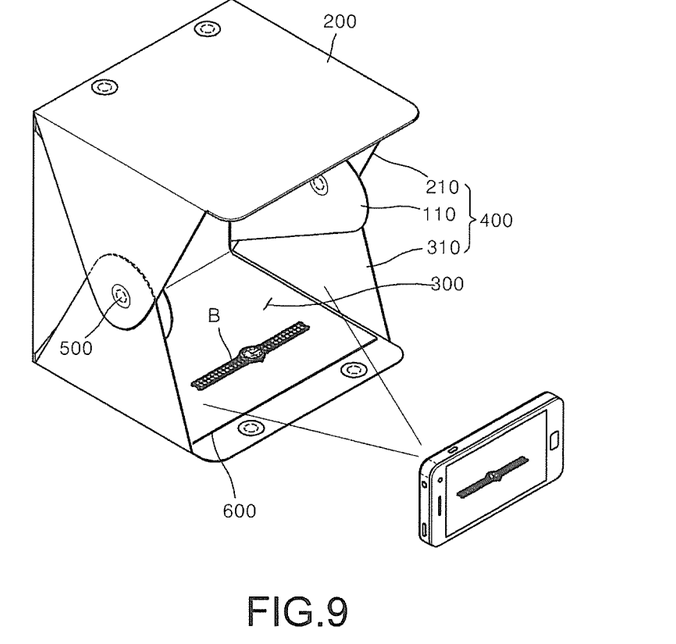
FIG. 9 is a view illustrating a use state according to one embodiment of the present invention.
Figure 10:
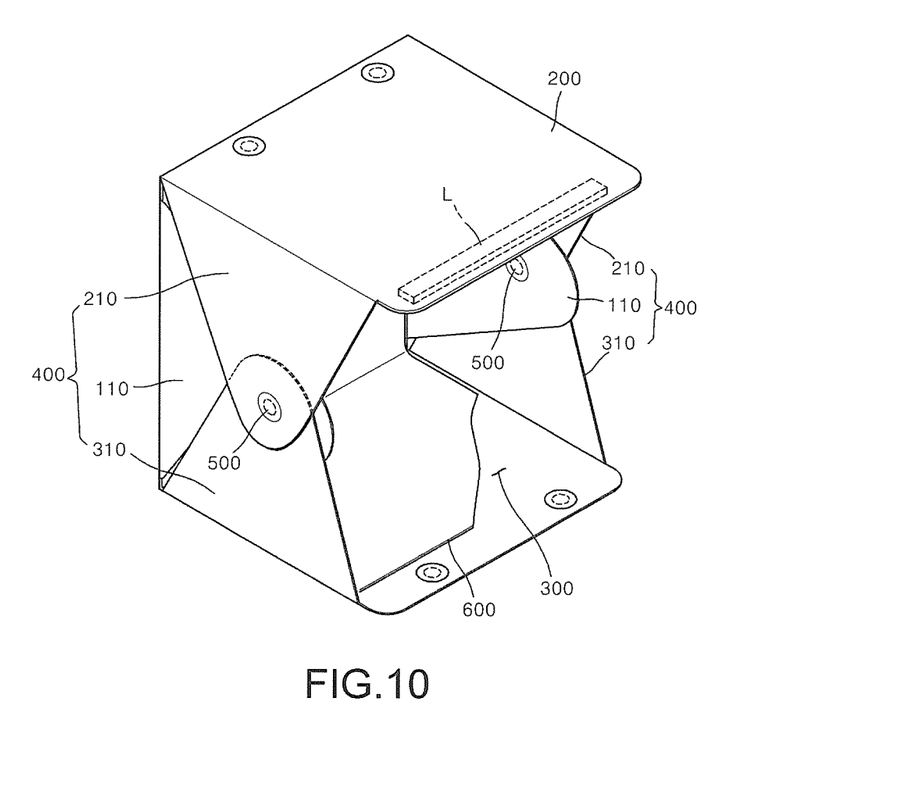
FIG. 10 is a perspective view illustrating a portable studio unit according to another embodiment of the present invention.
Figure 11:
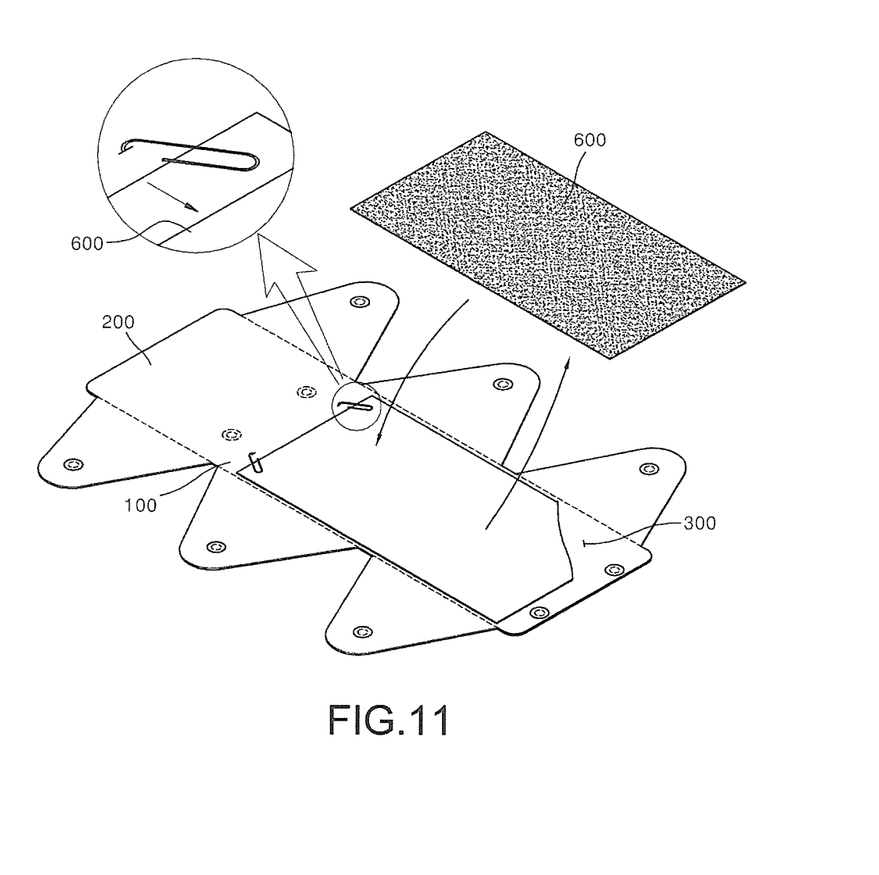
FIG. 11 is a view illustrating attachment/detachment of a photographing pad according to one embodiment of the present invention.

FIGS. 1 and 2 are development views illustrating a portable studio unit according to one embodiment of the present invention, FIG. 3 is a perspective view illustrating a carrying mode according to one embodiment of the present invention, FIGS. 4 to 6 are operational state views illustrating a switching sequence from the carrying mode of FIG. 3 to a photographing mode, FIG. 7 is a sectional view taken along line VII-VII of FIG. 6, FIG. 8 is a perspective view illustrating a photographing mode according to one embodiment of the present invention, FIG. 9 is a view illustrating a use state according to one embodiment of the present invention, FIG. 10 is a perspective view illustrating a portable studio unit according to another embodiment of the present invention, and FIG. 11 is a view illustrating attachment/detachment of a photographing pad according to one embodiment of the present invention.

As exemplarily illustrated in the above drawings, in accordance with one embodiment of the present invention, the portable studio unit includes a first main body portion 100, a second main body portion 200, a third main body portion 300, and pairs of side surface finishing portions 400.

The first main body portion 100 defines any one plane among three axes planes that construct a three dimensional figure.

The second main body portion 200 is connected to the first main body portion 100 so as to be folded to or unfolded from the first main body portion.

The third main body portion 300 is located at an opposite side of the second main body portion 200 with the first main body portion 100 interposed therebetween and is connected to the first main body portion 100 so as to be folded to or unfolded from the first main body portion.

In the case where the second main body portion 200 and the third main body portion 300 are folded to the first main body portion 100 such that the first main body portion 100 defines a rear surface of the three dimensional figure and the second main body portion 200 and the third main body portion 300 are located opposite each other to define an upper surface and a lower surface of the three dimensional figure respectively, the side surface finishing portions 400 are arranged at side surfaces of the three dimensional figure corresponding to open regions defined by the first main body portion 100, the second main body portion 200 and the third main body portion 300 except for a front surface facing the rear surface, thereby delimiting a receiving space.

In accordance with one embodiment of the present invention, in the case where the first main body portion 100, the second main body portion 200, the third main body portion 300 and the side surface finishing portions 400 construct the three dimensional figure, an article may be introduced into and placed in the receiving space through the open front surface for photographing (in a photographing mode). Then, after photographing of the article ends, as the second main body portion 200 and the third main body portion 300 are folded to overlap the first main body portion 100, the portable studio unit may be carried and stored in a thin plate form.

Here, although the first main body portion 100, the second main body portion 200, the third main body portion 300 and the side surface finishing portions 400 in accordance with one embodiment of the present invention may be forming of paper, they may also be formed of various other materials such as, for example, a synthetic resin and a metal, without being limited thereto.

Meanwhile, the side surface finishing portions 400 employed in one embodiment of the present invention include a pair of second main body finishing portions 210 and a pair of third main body finishing portions 310.

First, the second main body finishing portions 210 are connected to the second main body portion 200 so as to be folded to or unfolded from the second main body portion.

The third main body finishing portions 310 are connected to the third main body portion 300 so as to be folded to or unfolded from the third main body portion. In the case where the first main body portion 100, the second main body portion 200 and the third main body portion 300 are folded to construct the three dimensional figure in the photographing mode to enable photographing of the article, the respective third main body finishing portions 300 are connected to the second main body finishing portions 210 to close some regions of the open side surfaces along with the second main body finishing portions 210.

In addition, the side surface finishing portions 400 employed in one embodiment of the present invention further include a pair of first main body finishing portions 110. The first main body finishing portions 110 are connected to the first main body portion 100 so as to be folded to or unfolded from the first main body portion. In a state in which the second main body finishing portions 210 and the third main body finishing portions 310 are connected to each other, the first main body finishing portions are connected to the second main body finishing portions 210 or the third main body finishing portions 310, so as to close the open side surfaces.

Here, in accordance with one embodiment of the present invention, the portable studio unit further includes a position fixing means 500 arranged at the first main body finishing portions 110, the second main body finishing portions 210 and the third main body finishing portions 310.

The position fixing means 500 serves to fix relative positions between the second main body portion 200 and the third main body portion 300 when the first main body portion 100, the second main body portion 200 and the third main body portion 300 are folded to construct the three dimensional figure in the photographing mode.

The position fixing means 500 includes magnetically attracting pieces coupled to at least one of the second main body finishing portions 210 and the third main body finishing portions 310 and magnetically attracted pieces coupled to the other second or third main body finishing portions 210 or 310. At this time, the magnetically attracting pieces mean elements that generate a magnetic field, and the magnetically attracted pieces mean elements that can be attracted by the magnetically attracting pieces. Such a magnetically attracted piece may include a magnet.

In one embodiment of the present invention, the position fixing means 500 as described above may be configured into a magnetic coupling means, which includes not only second main body magnets and third main body magnets mentioned above as constituting the position fixing pieces 500, but also first main body magnets to be magnetically coupled with the second main body magnets. At this time, the first main body magnets are coupled to the first main body finishing portions 110.

In accordance with one embodiment of the present invention, the portable studio unit may further include a magnetic coupling means. The magnetic coupling means enable magnetic coupling between at least one of the second main body finishing portions 210 and the third main body finishing portions 310 and the first main body finishing portions 110 in a state in which the second main body finishing portions 210 and the third main body finishing portions 310 are connected to each other, in order to allows positions of the first main body finishing portions 110 to be fixed relative to the second main body finishing portions 210 and the third main body finishing portions 310.

Hereinafter, a process of switching from a carrying mode to a photographing mode of the portable studio unit in accordance with one embodiment of the present invention will be described with reference to FIGS. 4 to 6.

First, in a state in which the first main body portion 100, the second main body portion 200, the third main body portion 300, and the side surface finishing portions 400 are folded as exemplarily illustrated in FIG. 4, the second main body portion 200 and the third main body portion 300 are unfolded from the first main body portion 100 as exemplarily illustrated in FIG. 3. At this time, the first main body finishing portions 110 of the first main body portion 100 are attached to each other by respective pieces of the position fixing means 500 provided thereat, the second main body finishing portions 210 of the second main body portion 200 are attached to each other by respective pieces of the position fixing means 500 provided thereat, and the third main body finishing portions 310 of the third main body portion 300 are attached to each other by respective pieces of the position fixing means 500 provided thereat.

In such a state, the second main body portion 200 and the third main body portion 300 are folded so as to be upright. At this time, the second main body portion 200 and the third main body portion 300 are simply erected in a state in which the first main body portion 100 to define the rear surface is placed on the ground to define the lower surface. Then, the second main body finishing portions 210 of the second main body portion 200 and the third main body finishing portions 310 of the third main body portion 300 are coupled to each other via the respective pieces of the position coupling means 500.

Thereby, the second main body portion 200 and the third main body portion 300 are located opposite each other so as to define the respective surfaces of the three dimensional figure.

Thereafter, as exemplarily illustrated in FIG. 6, the first main body finishing portions 110 of the first main body portion 100 are coupled respectively to the second main body finishing portions 210 or the third main body finishing portions 310 in a state in which the second main body finishing portions 210 and the third main body finishing portions 310 are coupled to each other. As such, it can be appreciated that the first main body finishing portions 111 of the first main body portion 110, the second main body finishing portions 210 and the third main body finishing portions 310 are coupled to one another via the respective pieces of the position coupling means 500.

Subsequently, as exemplarily illustrated in FIG. 8, the resulting three dimensional figure is rotated such that the first main body portion 100 is located at the rear surface, the second main body portion 200 is located at the upper surface, and the third main body portion 300 is located at the lower surface thereof. At this time, upper and lower positions of the second main body portion 200 and the third main body portion 300 may be interchanged.

In a state in which the first main body portion 100 is located at the rear surface as described above, as exemplarily illustrated in FIG. 9, an article B may be placed on the third main body portion 300 to enable photographing thereof using a camera.

Now, a process of switching from the photographing mode to the carrying mode after completion of photographing via the portable studio unit in accordance with one embodiment of the present invention will be described.

As exemplarily illustrated in FIG. 9, after photographing of the article B, the portable studio unit is folded in reverse for switching from the photographing mode to the carrying mode.

For example, as exemplarily illustrated in FIG. 5, first, both the first main body finishing portions 110 are folded inward. As such, the first main body finishing portions 110 are folded onto and fixed to the first main body portion 100 by the respective pieces of the position fixing means 500 provided at the first main body finishing portions 110.

Subsequently, the second main body finishing portions 210 and the third main body finishing portions 310, coupled to each other via the respective pieces of the position fixing means 500, are separated from each other. Then, the upright second main body portion 200 and the upright third main body portion 300 are unfolded from the first main body portion 100.

Subsequently, as exemplarily illustrated in FIG. 4, the second main body finishing portions 210 and the third main body finishing portions 310 are folded inward. At this time, the second main body finishing portions 210 are folded onto and fixed to the second main body portion 200 by the respective pieces of the position fixing means 500 of the second main body finishing portions 210, and the third main body finishing portions 310 are folded onto and fixed to the third main body portion 000 by the respective pieces of the position fixing means 500 of the third main body finishing portions 310.

Subsequently, when the second main body portion 200 is folded and the third main body portion 300 is folded, the portable studio unit is in the carrying mode in which the user can conveniently carry the portable studio unit. At this time, the third main body portion 300 and the second main body portion may be provided with additional pieces of the position fixing means 500 such that the second main body portion 200 and the third main body portion 300 are fixed to each other in the folded state.

In one embodiment of the present invention as exemplarily illustrated in FIG. 10, the second main body portion 200 may be provided with a portable illuminator L that is capable of emitting light, in order to emit light to the receiving space. Provision of the portable illuminator L has an advantage of illuminating the article B placed in the receiving space, five sides of which are closed by the first main body portion 100, the second main body portion 200, the third main body portion and the finishing portions 400, at the same illumination.

FIG. 11 is a view illustrating attachment/detachment of a photographing pad employed in one embodiment of the present invention. As exemplarily illustrated in FIG. 11, in one embodiment of the present invention, the portable studio unit may further include a photographing pad 600. The photographing pad 600 is detachably attached inside the receiving space and used as a background, on which the article is placed, to hide edges of the receiving space. Although the photographing pad 600 in accordance with one embodiment of the present invention is configured to be fitted to the first main body portion 100 by known coupling means such as clips to thereby be fixed by elasticity of the clips, the present invention is not limited thereto and the photographing pad 600 may be fitted to the second main body portion 200 or the third main body portion 300. At this time, the clips as the known coupling means may be replaced with other known coupling means such as tacks.

In addition, instead of providing the additional coupling means such as clips or tacks, the first main body portion 100 may be formed at some portions thereof with incisions for use as coupling means.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A portable studio unit comprising:
 a first main body portion configured to define any one plane among three axes planes constructing a three dimensional figure;
 a second main body portion connected to the first main body portion so as to be folded to or unfolded from the first main body portion;
 a third main body portion located at an opposite side of the second main body portion with the first main body portion interposed therebetween, the third main body portion being connected to the first main body portion so as to be folded to or unfolded from the first main body portion; and
 pairs of side surface finishing portions arranged at side surfaces of the three dimensional figure corresponding to open regions defined by the first main body portion, the second main body portion and the third main body portion except for a front surface so as to delimit a receiving space when the second main body portion and the third main body portion are folded to the first main body portion such that the first main body portion defines a rear surface of the three dimensional figure facing the front surface and the second main body portion and the third main body portion are located opposite each other to define an upper surface and a lower surface of the three dimensional figure respectively,
 wherein, when the first main body portion, the second main body portion, the third main body portion and the side surface finishing portions construct the three dimensional figure, an article is introduced into and placed in the receiving space through the open front surface for photographing and, after photographing of the article ends, the second main body portion and the third main body portion are folded to overlap the first main body portion so as to allow the portable studio unit to be carried and stored in a thin plate form, and
 wherein the side surface finishing portions include:
 a pair of second main body finishing portions connected to the second main body portion so as to be folded to or unfolded from the second main body portion; and
 a pair of third main body finishing portions connected to the third main body portion so as to be folded to or unfolded from the third main body portion, wherein, when the first main body portion, the second main body portion and the third main body portion are folded to construct the three dimensional figure in a photographing mode to enable photographing of the article, the third main body finishing portions are connected respectively to the second main body finishing portions to close some regions of the open side surfaces along with the second main body finishing portions.

2. The portable studio unit according to claim 1, wherein the side surface finishing portions further include a pair of first main body finishing portions connected to the first main body portion so as to be folded to or unfolded from the first main body portion, the first main body finishing portions being connected to the second main body finishing portions or the third main body finishing portions so as to close the open side surfaces in a state in which the second main body finishing portions and the third main body finishing portions are connected to each other.

3. The portable studio unit according to claim 2, further comprising a magnetic coupling means configured to enable magnetic coupling between at least one of the second main body finishing portions and the third main body finishing portions and the first main body finishing portions in a state in which the second main body finishing portions and the third main body finishing portions are connected to each other, in order to allows positions of the first main body finishing portions to be fixed relative to the second main body finishing portions and the third main body finishing portions.

4. The portable studio unit according to claim 1, further comprising a position fixing means configured to fix relative positions between the second main body portions and the third main body portions when the first main body portion, the second main body portion and the third main body portion are folded to construct the three dimensional figure in the photographing mode, wherein the position fixing means includes magnetically attracting pieces coupled to at least one of the second main body finishing portions and the third main body finishing portions and magnetically attracted pieces coupled to the third main body finishing portions, the magnetically attracted pieces being attracted by the magnetically attracting piece.

5. The portable studio unit according to claim 1, further comprising a photographing pad detachably attached to the receiving space, the article being placed on the photographing pad.

* * * * *